(12) United States Patent
Karla et al.

(10) Patent No.: US 9,031,551 B2
(45) Date of Patent: May 12, 2015

(54) CELLULAR TELECOMMUNICATIONS SYSTEM NETWORK ELEMENT

(75) Inventors: Ingo Karla, Schermbeck (DE); Edgar Kuehn, Stuttgart (DE)

(73) Assignee: Alcatel Lucent, Boulogne Billancourt (FR)

( * ) Notice: Subject to any disclaimer, the term of this patent is extended or adjusted under 35 U.S.C. 154(b) by 71 days.

(21) Appl. No.: 13/805,619

(22) PCT Filed: Jun. 9, 2011

(86) PCT No.: PCT/EP2011/059561
§ 371 (c)(1),
(2), (4) Date: Dec. 19, 2012

(87) PCT Pub. No.: WO2012/000760
PCT Pub. Date: Jan. 5, 2012

(65) Prior Publication Data
US 2013/0095817 A1 Apr. 18, 2013

(30) Foreign Application Priority Data
Jun. 29, 2010 (EP) .................................. 10290349

(51) Int. Cl.
*H04W 24/02* (2009.01)
*H04W 36/26* (2009.01)
*H04W 36/22* (2009.01)

(52) U.S. Cl.
CPC ............. *H04W 24/02* (2013.01); *H04W 36/22* (2013.01); *H04W 36/26* (2013.01)

(58) Field of Classification Search
USPC .................. 455/418, 422.1, 424, 425, 432.1, 455/434–444; 370/331–335
See application file for complete search history.

(56) References Cited

U.S. PATENT DOCUMENTS

| 5,777,534 A | 7/1998 | Harrison |
| 5,936,490 A | 8/1999 | Hershtig |
| 6,504,828 B1 | 1/2003 | Corbett |

FOREIGN PATENT DOCUMENTS

| EP | 1 418 782 | 5/2004 |
| EP | 1 418 782 A1 | 5/2004 |
| EP | 1 499 147 | 1/2005 |
| EP | 1 887 809 A1 | 2/2008 |

(Continued)

OTHER PUBLICATIONS

"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.0.0 Release 8)," ETSI Standards, ETSI TS 136 300 V8.0.0, XP014038499, 84 pages, Mar. 1, 2007.

(Continued)

*Primary Examiner* — Kashif Siddiqui
(74) *Attorney, Agent, or Firm* — Fay Sharpe LLP (57) ABSTRACT

A network element (326) of a cellular telecommunications system (300), the network element comprising: classification means (336) for assigning a classification to a user service, request (332) for a telecommunications service of the cellular telecommunications system; and—assigning means (338) for assigning a set of class specific cell configuration parameters (334) that are to be used for the provision of the telecommunications service, wherein the assignment of the class specific cell configuration parameters depends upon the classification.

13 Claims, 3 Drawing Sheets

(56) References Cited

FOREIGN PATENT DOCUMENTS

| | | |
|---|---|---|
| JP | 2005-051767 | 2/2005 |
| JP | 4611536 | 1/2011 |
| KR | 10-0651101 | 11/2006 |
| WO | WO 00/07260 A2 | 2/2000 |
| WO | WO 00/54540 | 9/2000 |
| WO | WO 00/54540 A1 | 9/2000 |
| WO | WO 03/105516 A1 | 12/2003 |
| WO | WO 2006/062306 | 6/2006 |
| WO | WO 2006/062306 A1 | 6/2006 |
| WO | WO 2008/115838 A2 | 9/2008 |

OTHER PUBLICATIONS

International Search Report for PCT/EP2011/059561 dated Jul. 15, 2011.

CELLULAR TELECOMMUNICATIONS SYSTEM NETWORK ELEMENT

FIELD OF THE INVENTION

The invention relates to cellular telecommunications systems, in particular to the assignment of cell configuration parameters by a network element.

BACKGROUND OF THE INVENTION

The use of smart phones and other computing devices connected to cellular telecommunication systems has drastically increased the amount of data being transferred by the cellular communications systems. In addition current cellular telephones are capable of using a wide variety of media and data.

The amount of traffic which is served by a cell can be modified by assigning users in the overlap area between two cells to one or the other of these two cells. In other words, there is a certain overlap or border area between two cells where the mobile terminal may be served by any of these two neighboring cells. Via an intra-system handover mechanism, mobile terminals can be assigned to the desired cell.

One mobile terminal is handed over from one cell to another according to the hand-over parameter settings in combination with the actual radio link conditions from the serving cell in comparison to neighbor candidate cells. The handover configuration settings controlled how early or how late the mobiles are handed over from one cell to another.

SUMMARY OF THE INVENTION

The invention provides for a network element of a cellular telecommunications system, a method of assigning a set of class-specific cell configuration parameters for a user service request, and a computer readable storage medium in the independent claims. Embodiments are given in the dependent claims.

A difficulty with state of the art systems is that there is currently no solution for doing service type specific load balancing between LTE cells because there is currently only one single set of handover configuration settings for one cell (Time To Trigger TTT, Handover Margin HOM and the measurement filter coefficient) and one single "cell individual offset" (CIO) or Offset Cell index-number (OCn) towards each neighbor defined in 3GPP LTE. These handover settings apply to all users, i.e. independent of the service of the users.

While this basic handover operation is working, it does not exploit the possible performance gains which can be achieved with more user dependent diversity, i.e., that users of different service classes are treated differently. All users are treated in the same manner regardless of the required Quality of Service (QoS), whether it is a real-time or a non-real-time service and whether the there is a minimum required data rate for that service or not. Moreover, especially in the inter-RAT case, an adequate distribution of users leads to an improved network efficiency.

Embodiments of the invention may address this problems by providing for a network element which assigns a classification to a user service request. A set of class specific cell configuration parameters are then assigned to be used for the provision of the telecommunications service.

Embodiments of the invention may comprise several parts which provide the necessary functionality for service class dependent load balancing and the signaling requirements to allow its powerful self organization, i.e. on a semi-static time scale.

1) Mechanism to execute for service class dependent load balancing LTE (and other mobile telecommunication systems) have defined for the mobile users several different service classes, which define a certain set of service requirements, like e.g. real-time/non-real-time, amount of guaranteed data rate, delay requirements, . . . Typically, this set of requirements corresponds to a typical kind of application, e.g. voice telephony, video streaming, internet-surfing, etc.

For intra-LTE handovers, there is currently one single set of handover parameters defined for each cell and one single parameter, the "cell individual offset" for influencing the handover level between two particular cells. So far, all users are treated in the same way; the handover to a neighbouring cell is initiated only based on the users radio link conditions (with timer TTT, hysteresis HOM and cell individual offset or offset cell index-number—independent of the service class of that user.

In some embodiments of the invention, not all users are treated in the same way. It is proposed to set different handover parameters for the mobile users. In particular, relevant users could be grouped together and a certain set of handover parameters could be set for those users which belong e.g. to a certain service class. In other words, depending on the service class of a user, the system has the possibility to initiate a handover to a neighbor earlier or later in order to carry out load balancing for distinct, well suited services or to exclude non or less suited services from load balancing. The system can assign a particular type of users and/or services to the desired cell. The type of users may refer to a user classification or a user profile.

In this way, embodiments of the invention may have mechanisms to control how to assign users best and selectively, i.e. depending on certain service classes, to the best suited cell, and to arrange the users in the border area in such a way that the system can achieve the optimal benefit. Especially when there are some users/services with a large demand of radio resources, then the system can benefit when one cell serves this large user, while at the same time it can move some of its other users to a neighboring cell in order to free some resources which may be needed for that large user.

2) Functionality required powerful self organization of service class dependent load balancing:

In this section, the required functionality of some embodiments of the invention is addressed, i.e. the signalling information exchange, which may be needed to allow the system, to find out which service class dependent user assignment shall be achieved for the optimal system performance.

Handover parameter settings can be be coordinated between two neighboring cells. I.e. when one of the two cells initiates a handover earlier then the other cell could keep their mobiles longer before starting the handover procedure to the first cell. If there may be no coordination, between the two cells, then the following unwanted effects occur: If both cells initiate to hand over their mobiles earlier, then the mobile users tend to ping-pong between the two cells. Each cell tends to send away their mobiles in the common border area. If both cells keep their mobiles longer, then both cells can to invest unnecessarily a larger amount of radio resources (because a more robust coding is may be needed for the larger basestation to mobile distance). Both of those effects reduce the system performance and are not desired. (To be precise, it can also occur the situation, that only one cell varies its handover parameters, then the resulting effects are a mixture with partial effects of the above problems). So a coordination between cells may be beneficial, which thus could requires some signaling information exchange:
a) Information exchange about the cell load information
b) Information related to handover parameter settings
c) Information related to user equipment related measurement reporting events.

With regard to a):

The decision entity may require the relevant cell load information of those cells, between which it decides how to arrange the resources in an optimal way, i.e. by setting the handover parameters. This particular cell load information may be exchanged via signaling interfaces, as it is currently specified in 3GPP, but there only for cell-global load information values, it does not distinguish any separate values for specific service classes. This invention proposes to exchange more detailed cell load information, i.e. service class dependent ones, as outlined below.

With regard to b):

The cells may have information about the current handover parameter settings in those neighboring cells with which the handover settings are coordinated. In centralized O&M scenarios, the information is provided and set via the central O&M system. However, the trend goes towards distributed decisions, decentralized inside the basestations, and for this fully distributed approach the information is exchanged directly between the basesations. Thus, there can be a kind of information exchange between the cells which allow to know or derive which handover settings are used. This information exchange could be achieved e.g. via dedicated information about which handover settings are used. It may also be possible to take a kind of command or negotiation which orders or triggers the neighboring cell to configure certain handover settings when there is a predefined behavior on this command, like that the receiving cell can overtake the commanded settings.

For both aspects, a) and b), the exchanged information, i.e. the cell load information and the information/command about particular handover settings, may carry individual information for those service classes which are treated separately. This means, that when for example n (groups of) service classes are handled separately, that then specific cell load information values for (at least) these n (groups of) service classes may be exchanged, and that the handover parameter settings may be exchanged for these n (groups of) service classes. This detailed information exchange about the load and settings of different service classes allows managing service class dependent load balancing.

Based on those service class dependent cell load information exchange, an intelligent self organizing network (SON) algorithm has then the information basis to find those handover parameters for each service class which achieve the maximal bene fit, like to maximize the user Quality of Service and to optimize the system resource usage.

In one aspect the invention provides for a network element of a cellular telecommunications system. A network element as used herein encompasses a computing device attached to a network of the cellular telecommunications system. In other words, the network element is adapted for communicating with other components of the cellular telecommunications system. The network element comprises a classification means for assigning a classification to a user service request for a telecommunications service of the cellular telecommunications system. The network element further comprises an assigning means for assigning a set of class-specific cell configuration parameters that are to be used for the provision of the telecommunications service.

The assignment of the class-specific cell configuration parameters may depend upon the classification. The user service request may be for one of a variety of different services. For instance the user service request may request voice, web browsing, streaming video, a video gaming service, voice over IP or a video call. The classification may also encompass a user class or a user classification of the service request. In other words, users may have different priories assigned to them for different classifications of services. This allows different user classes or user classifications to be tailored to specific needs. A user class for businesses may specify a high priority or level of service for voice communications and a low level of priority for web browsing. In contrast a retail customer could be assigned a user class which give a high priorty to online games and internet surfing but a lower priority to voice communications. For the retail customer occasionally loosing voice communications may be acceptable, but for business customers it may not. This classification could also be used for classifying a user service request.

The cell configuration parameters as used herein encompasses parameters which are produced to control the interaction of a user equipment with a cellular telecommunications cell and/or to control the interaction between two cellular communications cells. This is advantageous because instead of a single set of cell configuration parameters being used for all user equipment attached to the cellular telecommunications system the cell configuration parameters are assigned to a user service re quest depending upon its classification. In some embodiments, the cell configuration parameters are assigned to groups of user service requests. This may allow the more efficient allocation of bandwidth by a specific cell. For example, if several users are downloading internet data with their user equipment their downloading of data may be delayed slightly without a noticeable effect in their level of quality of service. However, one making a live voice or video conference would instantly notice a degradation in the level of service from the cellular telecommunications system.

In another embodiment the classification is assigned at least partially according to a service class of the user service request. In this embodiment the user service request is assigned according to the type of usage that is requested in the user service request. A 'service class' as use herein encompasses a classification of the type of data exchanged between a user equipment and the cellular telecommunications system.

In another embodiment the classification is assigned at least partially according to a user class assigned to the user service request. In some embodiments the user class is associated with a user profile. For instance an operator of a cellular telecommunications system could sell contracts for usage of the system which have different levels or guarantees of service. For instance there could be gold, silver and bronze users of the cellular telecommunications system. In some embodiments there could be different user classes assigned to the different service classes. For instance one could pay for a higher service class of voice and specify a lower user class for services which are used infrequently or not used at all. Assigning a classification at least partially to the user class also has the benefit when the network is extremely busy. For instance police or other emergency workers could be given a higher priority with their user class during a natural disaster when telecommunication networks are extremely busy these users could be given priority for usage of the cellular telecommunications system.

In another embodiment the network element further comprises a message receiving means for receiving a load message from a cell. If the network element is incorporated into the cell for instance as part of a base station or a node B then the message receiving means may be implemented via software where a message is passed from one software module to another. In other embodiments the network element is a distinct computing device which may in some embodiments receive a message via the cellular telecommunications system's internal network.

In some embodiments the load message could be a conventional load message which summarizes the total load on the cell or the load message could comprise the cell load classified by service class and/or user classes and/or information related to user equipment related measurement reporting events.

In another embodiment the load message is descriptive of the usage of the cell.

In another embodiment the load message is descriptive of the cell configuration parameters of the cell. In some embodiments, the cell configuration parameters of the cell could be class specific cell configuration parameters. In other embodiments the cell configuration parameters of the cell are not class specific.

In another embodiment the load message comprises the cell load classified by service classes and/or user classes. The load message may simply contain a table or array which provides the cell usage by various service classes and/or user classes. In some embodiments, this could be a two or three-dimensional table or array.

The network element further comprises a modification means for modifying the set of class-specific cell configuration parameters using the load message. In other words depending upon which type of users are using which type of services, the cell configuration parameters can be adjusted for any or all of the other users connected to the cellular telecommunications system. This embodiment is particularly advantageous because modifying the set of class-specific cell configuration parameters allows load balancing with the cell and its neighbors. Both the message receiving means and the modification means may in some embodiments be implemented as software. The message receiving means may also be implemented as a hardware component. In some embodiments the message receiving means may allow the network element to communicate with an internal or external network of the cellular telecommunications system.

In another embodiment the message receiving means is adapted for receiving an neighboring cell load message descriptive of the usage of cells neighboring the cell. The wording 'cells neighboring the cell' as used here may refer to cells which are physically adjacent to each other, to cells which are within a predefined geographical distance between each other, cells which are in a predefined neighborhood, or are connected by a communications network. In other words it is not necessary for cells to have overlapping service regions for cells to be considered to be neighboring. In managing a cellular communication network it may be beneficial to consider not just the load of not just cells which have overlapping service regions but also cells which in the same region or neighborhood. For instance if the handover parameters are adjusted for user equipment in a cell this may affect load balancing in cells which share overlapping service regions with that cell. The load balancing in the cells which share overlapping service regions may then affect load balancing in other cells and so on. In some embodiments the neighboring cell may be any cell able to exchange messages with the network element. For instance the neighboring cell may be a cell which may have a network connection to the network element.

The neighboring cell load message comprises the cell load of the cells neighboring the cell classified by the user classes. The network element further comprises a load balancing means for load balancing the base station using the load message and the neighboring cell load message. In this embodiment the load balancing means uses load of the cell and an neighboring cell to balance the load between the two cells. This embodiment is advantageous because the cell configuration parameters are divided according to classes. Priority can therefore be given to users who have subscribed for a better guarantee of service and/or to services which require an interrupted stream of data to the user equipment. In some embodiments, the cells may comprise information about the current handover parameter settings in those neighboring cells with which the handover settings are coordinated.

In another embodiment the message receiving means is adapted for receiving up dated load messages and updated neighboring cell load messages. The modification means is further adapted for dynamically updating the set of class-specific cell configuration parameters using the updated load messages and the updated neighboring cell load messages. This embodiment is particularly advantageous because the load of the cell and the neighboring cell will not be constant. Users may change their usage of a user equipment connected to the cellular telecommunications system. Also users may leave or enter the cell or the neighboring cell. It is therefore advantageous to dynamically update the set of class-specific cell configuration parameters.

In another embodiment the network element further comprises a user equipment messaging means adapted for exchanging messages with a user equipment which originated the user service request. The user equipment messaging means is a component of the network element. The user equipment messaging means is further adapted for transmitting the class-specific cell configuration parameters to the user equipment. The user equipment messaging means is further adapted for receiving a handover request from the user equipment. The network element further comprises a handover means for initiating a handover of the user equipment from the cell to a neighboring cell where the handover request is received. This embodiment is particularly advantageous because the user equipment could be responsible for making handover decisions in some embodiments. In this embodiment the user equipment makes handover requests, but the class-specific cell configuration parameters are used at least as a partial criterion for deciding when a handover request is made. This allows for improved management of connections between user equipment and the cellular telecommunications system.

In another embodiment the network element further comprises a cell boundary modification means for modifying cell boundaries for the user equipment using the usage message and the neighboring cell usage message. Essentially the change in the cell boundary is a measure of the geographical region serviced by a cell. The cell boundaries may be defined indirectly: the cell boundaries may be defined by hand over parameters and/or the inter-cell interference coordination parameters and/or the transmission power. The set of class-specific cell configuration parameters may comprise the handover parameters and/or the inter-cell interference coordination parameters and/or the transmission power in this embodiment. The cell boundaries may be different for different classifications of user service requests. For example, services such as voice may be given to a geographical region closer to the cell so that it is less likely that there are errors in transmission or reception when using the cellular telecommunications system. User requests for low priority services such as downloading data from the internet may be given lower priority by making the geographical region serviced by the cell larger. For such services it is not critical if there are occasionally failures. For example, in the case of a guaranteed fixed data rate such failures may be the blocking of the service or the dropping of a call.

In another embodiment the user profile specifies a minimum, quality of service. The minimum quality of service could be a guarantee for a certain data transfer rate. In other embodiments the minimum quality of service could be a guarantee of a maximum number of failures in data transfer for a specified time period. For instance a gold level service may specify that there s a low probability of voice service being dropped. For silver and bronze levels of service progressively higher levels of drop off or failures in a system may be allowed. The network element further comprises a quality of service guarantee means for guaranteeing the quality of service for particular classification of user equipment by adjusting the set of class-specific cell configuration parameters. In some embodiments the quality of service guarantee means is implemented as a software module.

In another embodiment the set of class-specific cell configuration parameters comprise load balancing parameters.

In another embodiment the set of class-specific cell configuration parameters comprise handover parameters.

In another embodiment the set of class-specific cell configuration parameters comprise inter-cell-interference-coordination parameters.

In another embodiment the set of class-specific cell configuration parameters comprise cell transmission power parameters.

In another embodiment the set of class-specific cell configuration parameters comprise measurement configuration parameters.

In another embodiment the network element is a base station.

In another embodiment the network element is a cell.

In another embodiment the network element is a sector.

In another embodiment the network element is a neighboring base station.

In another embodiment the network element is an adjacent base station. The adjacent base station need not be geographically adjacent to the base station. It does not need to be a direct neighbor.

In another embodiment the network element is a node B.

In another embodiment the network element is an enhanced node B.

In another embodiment the network element is a cellular communications system.

In another embodiment the network element is a network management entity. The term 'network management entity' encompasses any computing device which serves to manage or control at least a portion of a cellular communications system.

In another embodiment the network element is a radio network controller.

In another embodiment the network element is a computer integrated into the cellular telecommunications system.

In another embodiment the network element is a remote computer network to the cellular telecommunications system.

In another aspect the invention provides for a method of assigning a set of class-specific cell configuration parameters for a user service request for a telecommunications service from a cell of a cellular telecommunications system. The method comprises the step of assigning a classification to the user service request. The method further comprises the step of assigning a set of class-specific cell configuration parameters that are to be used for the provision of a telecommunications service. The assignment of the set of class-specific cell configuration parameters depends upon the classification. The advantages of this have been previously discussed.

In another embodiment the classification is assigned at least partially according to a service class of the user service request. The advantage of this has also been previously discussed.

In another embodiment the classification is assigned at least partially according to a user class assigned to the user service request. The advantage of this has also been previously discussed.

In another aspect the invention provides for a computer-readable storage medium storing machine readable instructions for execution by a processor of a network element of a cellular telecommunications system. Execution of the machine readable instructions causes the network element to perform the step of assigning a classification to a user service request for a telecommunication service from the cellular telecommunications system. The instructions further cause the network element to assign a set of class-specific cell configuration parameters that are to be used for the provision of the telecommunications service. The assignment of the class-specific cell configuration parameters depends upon the classification. The advantages of this have been previously discussed.

A computer-readable storage medium as used herein is any storage medium which may store instructions which are executable by a processor of a computing device. The computer-readable storage medium may be a computer-readable non-transitory storage medium. The computer-readable storage medium may also be a tangible computer readable medium. In some embodiments, a computer-readable storage medium may also be able to store data which is able to be accessed by the processor of the computing device. An example of a computer-readable storage medium include, but are not limited to: a floppy disk, a magnetic hard disk drive, a solid state hard disk, flash memory, a USB thumb drive, Random Access Memory (RAM) memory, Read Only Memory (ROM) memory, an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network.

Computer memory is an example of a computer-readable storage medium. Computer memory is any memory which is directly accessible to a processor. Examples of computer memory include, but are not limited to: RAM memory, registers, and register files.

A processor as used herein is an electronic component which is able to execute a program or machine executable instruction. References to the computing device comprising "a processor" should be interpreted as possibly containing more than one processor. The term computing device should also be interpreted to possibly refer to a collection or network of computing devices each comprising a processor. Many programs have their instructions performed by multiple processors that may be within the same computing device or which may even distributed across multiple computing device.

BRIEF DESCRIPTION OF THE DRAWINGS

In the following preferred embodiments of the invention will be discussed in greater detail by way of example only making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
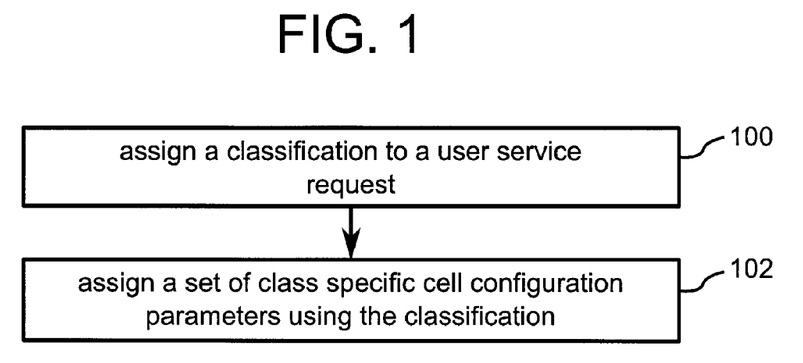
FIG. 1 shows a block diagram which illustrates a method according to an embodiment of the invention.

FIG. 1 shows a block diagram which illustrates a method according to an embodiment of the invention. In step 100 a classification is assigned to a user service request. In step 102 a set of class-specific cell configuration parameters is assigned using the classification.

Figure 2:
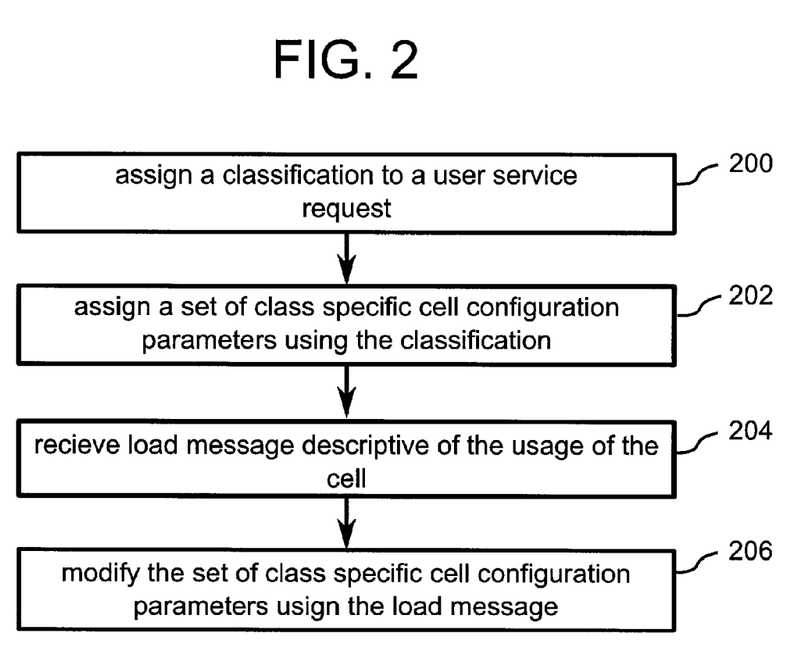
FIG. 2 shows a block diagram which illustrates a method according to a further embodiment of the invention.

FIG. 2 shows a block diagram which illustrates a further embodiment of a method according to the invention. In step 200 a classification is assigned to a user service request. In step 202 a set of class-specific cell configuration parameters is assigned using the classification. In step 204 a load message descriptive of the usage of the cell is received. Finally in step 206 the set of class-specific cell configuration parameters is modified using the load message. In this embodiment the service request is assigned a particular class-specific cell configuration parameter. However, the parameters are modified using the current usage of the cell.

In step 204 of FIG. 2, the load message is describes as being descriptive of the usage of the cell. In alternative embodiments, the load message is descriptive of the usage of the cell and/or the cell configuration parameters of the cell.

Figure 3:
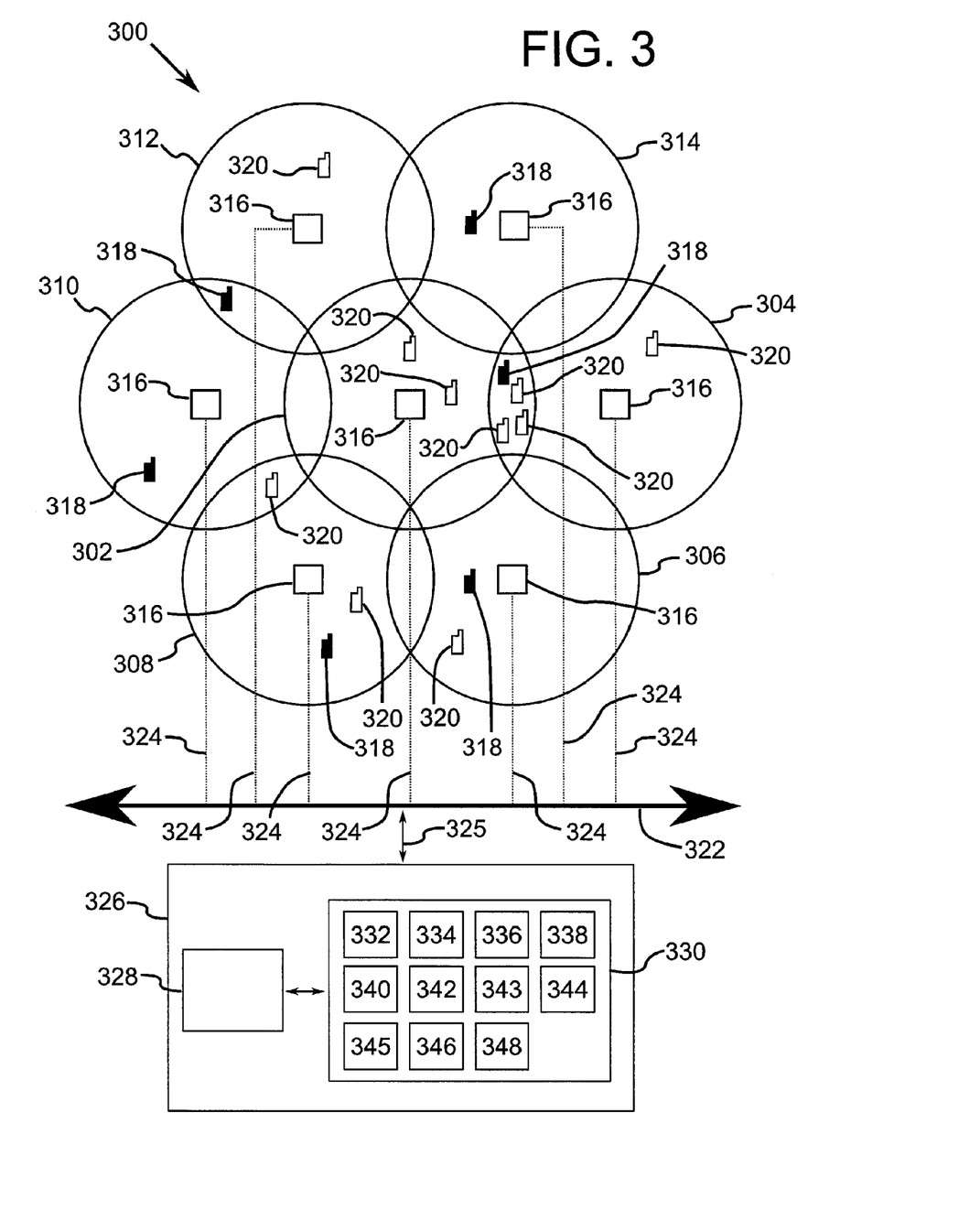
FIG. 3 illustrates a cellular telecommunications system.

FIG. 3 illustrates a cellular telecommunications system. In the middle of the drawing is shown cell one 302. Surrounding cell one 302 are cells two through seven 304, 306, 308, 310, 312, 314. Cells two through seven are adjacent to cell one 302 and are neighboring cells. Within each cell is a node B 316. The node B may also be a base station in some embodiments.

Within the cellular telecommunications network 300 are a variety of user equipments 318, 320. Shown are user equipment with a first user class 318 and user equipment with a second user class 320. These two different types of user equipment may represent different classes of user equipment which could be for instance users who have paid or subscribed to different guarantees of service. The first and second user equipment may also represent different classes of service. For instance some users may be using voice and others may be using Internet connection. In examining this figure it can be seen that the user equipment is not distributed evenly throughout the cellular telecommunications system 300. The cellular telecommunications system 300 also comprises a network 322. Network 322 can be seen as linking the node Bs 316 via connections 324 to the network 322.

A network element 326 is connected to the network 322 using a network interface 325. The network element 326 comprises a processor 328. Connected to the processor 328 is a memory 330. The memory 330 is an example of a computer-readable storage medium. The memory 330 may contain a user service request 332 which was received from one of the node Bs 316. The memory 330 may also contain class-specific cell configuration parameters 334 which may be sent to a node B 316. The memory also contains various software modules. The memory 330 is shown as containing a classification module 336 which is an implementation of a classification means. The memory 330 is also shown as containing an assigning module 338 which is an implementation or embodiment of an assigning means.

The memory 330 may also be used to store load messages 340. The memory is shown to further contain a modification module 342. The modification module 342 is an implementation or embodiment of a modification means. The memory 330 is shown as further containing a neighboring cell load message 343. The memory 330 is shown as further containing a handover module 344. The handover module 344 is an implementation or embodiment of a handover means. The memory 330 is shown as further containing a user equipment message module 345. The user equipment message module 345 is an implementation or embodiment of a user equipment messaging means. The memory 330 is shown as further containing a cell boundary modification module 346. The cell boundary modification module 346 is an implementation or embodiment of a cell boundary modification means. The memory 330 is shown as further containing a quality of service guarantee module 348. The quality of service guarantee module 348 is an implementation or embodiment of a quality of service guarantee means.

The network element 326 may also be implemented into one of the node Bs 316. The network element 326 may also be on an external network which is connected to the network 322 shown in FIG. 3.

Figure 4:
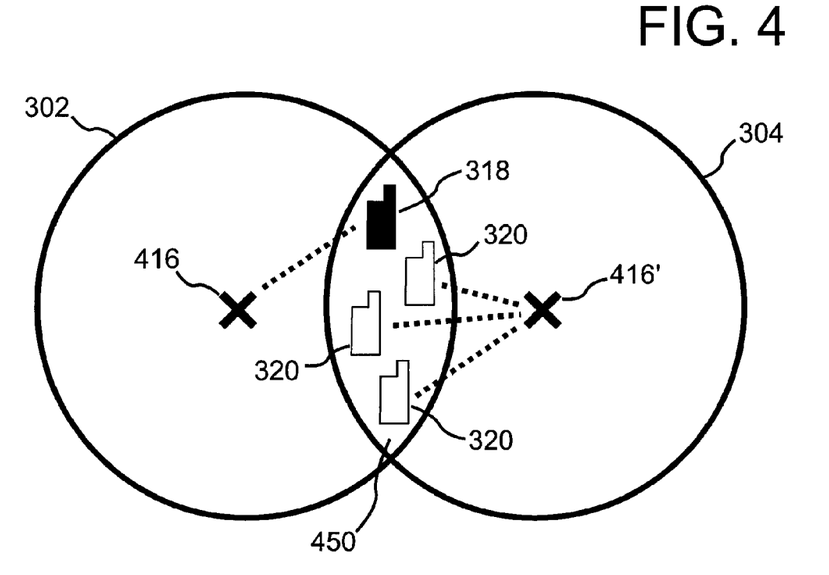
FIG. 4 illustrates two cells dividing service to user equipment according to an embodiment of the invention.

FIG. 4 shows a detail of cell one 302 and cell two 304 from FIG. 3. The node B or base station of cell one is labeled 416. The base station or node B of cell 2 304 is labeled 416. There is a region of overlapping coverage 460 between cell one 302 and cell two 304. Within the region of overlapping coverage 450 are four user equipments. There is one first user equipment 318 and three second user equipments 320. In this example the first user equipment 318 could be a user equipment for a mobile user with a very high data rate requirement. The second user equipment 320 may represent a mobile user or mobile users with low data rate requirement. To maintain uninterrupted service to the first user equipment 318 the first user equipment 318 is assigned to the base station 416 of cell one, 302. The second user equipments 320 are assigned to the base station 416 of cell two, 304.

As an example, suppose that cell one 302 and cell two 304 have the following load situation, i.e. in their border area 450: Cell one 302 has a single user which requires e.g. a high-definition video streaming service with a very large data rate, while there are many other users with small data rate services (voice, web browsing) which are about uniformly distributed in that area.

Under the state of the art handover conditions, it would not be possible to serve all users in the cell (call drops, blocking). Either the service of the large data rate user or some of the small users in that cell would have to be dropped because the cell with the large data rate user does not have enough resources to serve everybody. The users are handed over based on the radio situations, the large data rate user and the small ones are treated in the same way, and there are always several small users in similar handover situations as the large data rate user. So there would be always some small users together with the large data rate one handed over to the less loaded neighbor cell. In this situation, the only way to serve everybody is to let one cell serve the large data rate user, while simultaneously move a required number of small data rate users to the other cell in order to free resources. This may be achieved by treating the users differently depending on their service classes, i.e. by setting different handover thresholds for the service class of the large data rate user and i.e. opposing handover thresholds for the small data rate users. However, modification of handover parameter settings for load balancing purposes has to be communicated, negotiated and set into operation between the neighbor cells in a coordinated way in order to avoid ping pong effects. Therefore, for load balancing purposes, service type or service type group specific load and handover setting parameters have to be exchanged.

Figure 5:
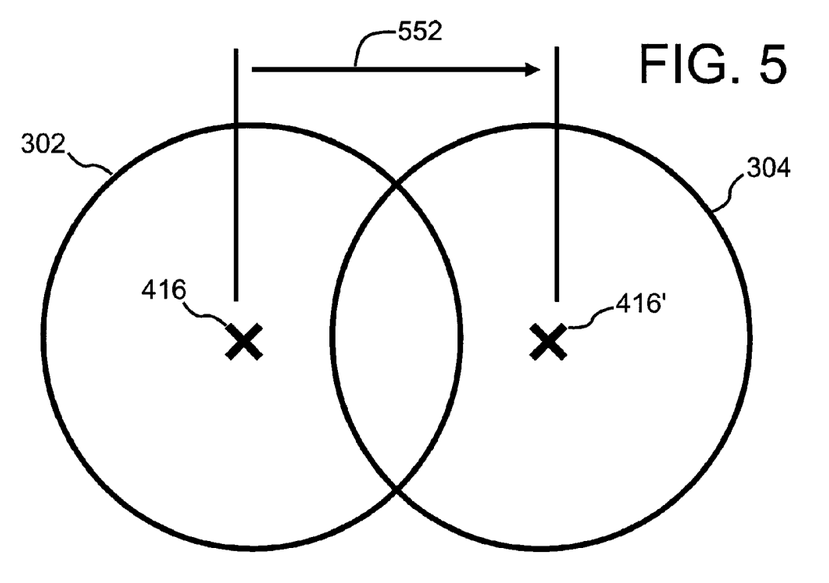
FIG. 5 shows an example of a transmission of a message between two neighboring base stations.

FIG. 5 shows an example of service class dependent load balancing for a self-organizing network. In this example cells one 302 and cells two 304 are shown again. The base station of cell one is again labeled 416 and the base station of cell two is again labeled 416'. In this example cell one sends a message 552 to cell two. This may be via the X2 interface. Alternatively the message may also be sent via the core network, using the S1 connection, a network cable, an Ethernet, or a radio link. In this embodiment there may be a network element in both cell one and cell two and each base station 416, 416 contains the classification and assigning means. The message 552 may contain such information as a cell load for service class 1 and a cell load for service class 2. The message 552 may also send hand-over configurations for a first service class and a handover configuration for a second service class. In some embodiments the message 552 may send service class specific configuration parameters. The base station of cell two, 416' may then use the message 552 to modify the set of class-specific cell configuration parameters.

FIG. 5 is intended to illustrate two different types of communications possible between neighboring base stations. One is unidirectional communications and the other is bidirectional communications. In unidirectional communications the message 552 is sent from cell one 302 to cell two 304. In bidirectional communications, the message 552 is first sent from cell one 302 to cell two 304. Cell two 304 then responds to cell one 302 with a response or acknowledgment message. The response of cell two 304 with a response of acknowledgement message is not shown in FIG. 5.

LIST OF REFERENCE NUMERALS 300 cellular telecommunication network
302 cell one
304 cell two
306 cell three
308 cell four
310 cell five
312 cell six
314 cell seven
316 Node B or base station
318 first user equipment
320 second user equipment
322 network
324 connection to network
325 network interface
326 network element
328 processor
330 memory
332 user service request
334 class specific cell configuration parameters
336 classification module
338 assigning module
340 load message
342 modification module
343 neighboring cell load message
344 handover module
345 user equipment message module
346 cell boundary modification module
348 quality of service guarantee
416 base station of cell one
416' base station of cell two
450 region of overlapping coverage
552 message

The invention claimed is:

1. A network element of a cellular telecommunications system, the network element comprising:
   at least one processor configured to operate as:
      a classifier configured to assign a classification to a user service request for a telecommunications service of the cellular telecommunications system wherein the classification is assigned at least partially according to a user class assigned to the user service request;
      an assigner configured to assign a set of class specific cell configuration parameters that are to be used for the provision of the telecommunications service, wherein the assignment of the class specific cell configuration parameters depends upon the classification;
      a message receiver configured to receive a load message from a cell; and
      a parameter modifier configured to modify the set of class specific cell configuration parameters using the load message.

2. The network element of claim 1, wherein the classification is assigned at least partially according to a service class of the user service request.

3. The network element of claim 1, wherein the load message is descriptive of the usage of the cell and/or the cell configuration parameters of the cell and/or information related to user equipment related measurement reporting events.

4. The network element of claim 1, wherein the load message comprises the cell load classified by service classes and/or user classes.

5. The network element of claim 1, wherein the message receiver is configured to receive a neighboring cell load message descriptive of the usage of cells neighboring the cell, wherein the neighboring cell load message comprises the cell load of the cells neighboring the cell classified by user classes and/or service classes, and wherein the network element further comprises a load balancer for load balancing the base station using the load message and the neighboring cell load message.

6. The network element of claim 1, wherein the message receiver is configured to receive updated load messages and updated neighboring cell load messages, and wherein the parameter modifier is further configured to dynamically update the set of class specific cell configuration parameters using the updated load messages and the updated neighboring cell load messages.

7. The network element of claim 1, wherein the at least one processor is further configured to operate as a user equipment messenger configured to exchange messages with a user equipment which originated the user service request, wherein the user equipment messenger is further configured to transmit the class specific cell configuration parameters to the user equipment, and wherein the user equipment messenger is further configured to receive a handover request from the user equipment, and wherein the at least one processor is further configured as a handover initiator configured to initiate a handover of the user equipment from the cell to a neighboring cell when the handover request is received.

8. The network element of claim 1, wherein a user profile specifies a minimum quality of service, wherein the at least one processor is further configured to operate as a quality of service guarantor that guarantees a quality of service for a particular classification of user equipment by adjusting the set of class specific cell configuration parameters.

9. The network element of claim 1, wherein the set of class specific cell configuration parameters comprise any one of the following: load balancing parameters, handover parameters, inter-cell-interference-coordination parameters, cell transmission power parameters, and measurement configuration parameters.

10. The network element of claim 1, wherein the network element is any one of the following: the base station, a neighboring base station, an adjacent base station, a Node B, an enhanced Node B, a relay, a network management entity, a radio network controller, a computer integrated into the cellular telecommunications system, a cell, a sector, and a remote computer networked to the cellular telecommunications system.

11. A method of assigning a set of class specific cell configuration parameters for a user service request for a telecommunications service from a cell a cellular telecommunications system, the method comprising:
   assigning a classification to the user service request, wherein the classification is assigned at least partially according to a user class assigned to the user service request;
   assigning a set of class specific cell configuration parameters that are to be used for the provision of the telecommunications service, wherein the assignment of the set of class specific cell configuration parameters depends upon the classification;
   receiving a load message from a cell; and
   modifying the set of class specific cell configuration parameters using the load message.

12. The method of claim 11, wherein the classification is assigned at least partially according to a service class of the user service request.

13. A non-transitory computer-readable storage medium storing machine readable instructions for execution by a processor of a network element of a of a cellular telecommunications network, wherein execution of the machine readable instructions causes the network element to perform:
   assigning a classification to a user service request for a telecommunications service from the cellular telecommunications system, wherein the classification is assigned at least partially according to a user class assigned to the user service request;
   assigning a set of class specific cell configuration parameters that are to be used for the provision of the telecommunications service, wherein the assignment of the class specific cell configuration parameters depends upon the classification;
   receiving a load message from a cell; and
   modifying the set of class specific cell configuration parameters using the load message.

* * * * *